April 22, 1958
T. S. HOLMES
2,831,699
TRUCK WHEEL ASSEMBLY
Filed May 3, 1954
2 Sheets-Sheet 1
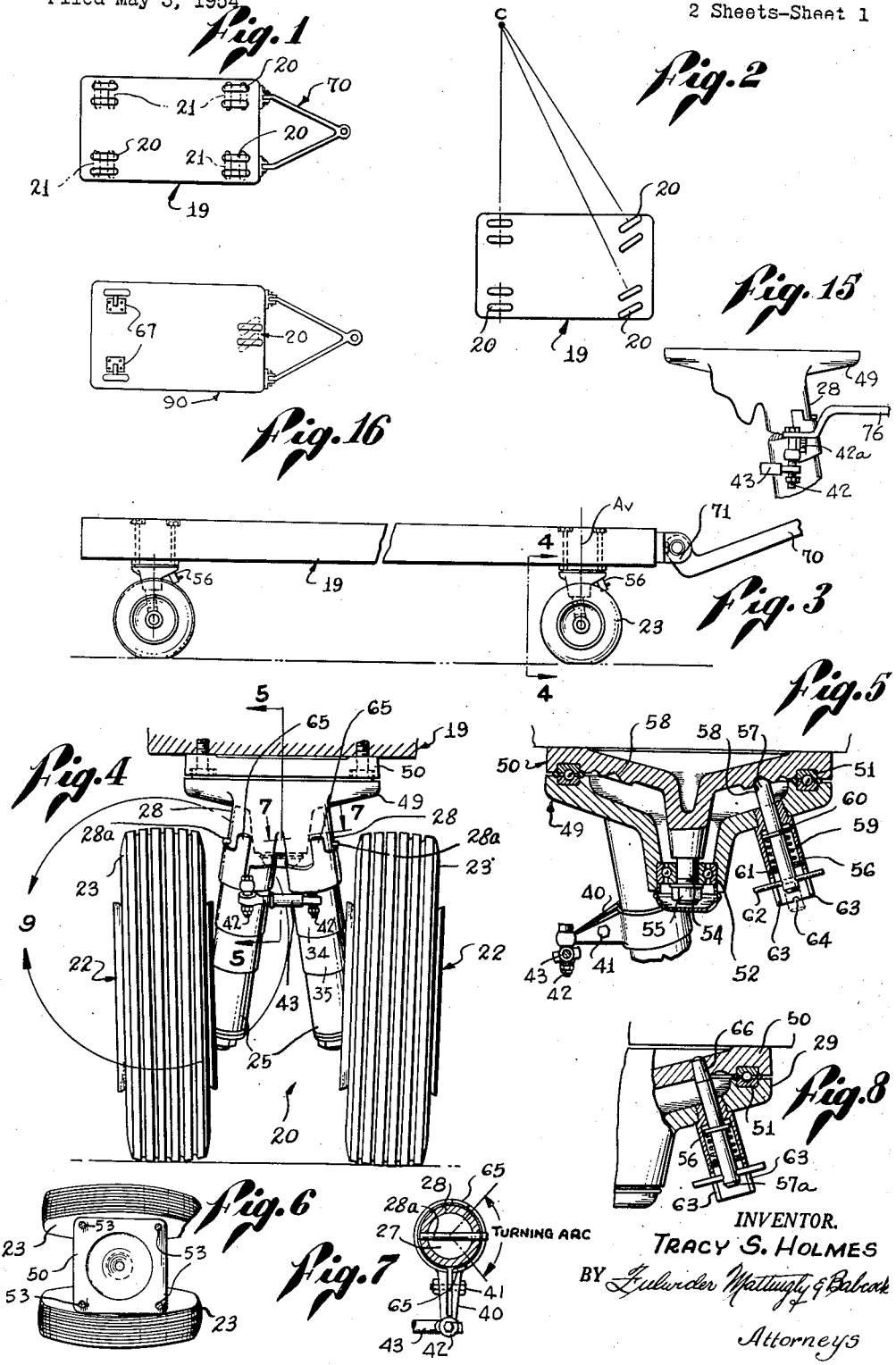
INVENTOR.
TRACY S. HOLMES
BY Fulwider Mattingly & Babcock
Attorneys April 22, 1958  T. S. HOLMES  2,831,699
TRUCK WHEEL ASSEMBLY
Filed May 3, 1954  2 Sheets-Sheet 2

INVENTOR.
TRACY S. HOLMES
BY Zulwider Mattingly & Babcock
Attorneys

United States Patent Office 2,831,699
Patented Apr. 22, 1958

2,831,699

TRUCK WHEEL ASSEMBLY

Tracy S. Holmes, Los Angeles, Calif., assignor to Superior Engineering Corporation, Culver City, Calif.

Application May 3, 1954, Serial No. 426,984

6 Claims. (Cl. 280—80)

This application relates generally to wheel assemblies for industrial hand trucks and the like, and more particularly to a mounting assembly for such wheels, which is especially adapted for use in connection with aircraft ground handling equipment.

The advent of large multi-engined aircraft and the mass production thereof has given rise to the design and use of a great variety of so-called ground handling equipment including servicing stands, engine dollies, loading elevators, embarking ladders, and stairway, and other movable fixtures used in connection with the manufacture, servicing, and use of aircraft. Ground handling equipment of the type just described, has, in the past, been made mobile by mounting the same on large-size conventional industrial truck casters of a design customarily used for baggage trucks and industrial trucks generally.

Conventional casters do not, however, meet many of the requirements of aircraft ground handling equipment, and are, in general, unsatisfactory for several reasons as will hereinafter appear. Mobile ground handling equipment has several special desiderata in addition to those of industrial handtrucks generally. For one thing, ground handling equipment must be capable of rapid transport over reasonably rough terrain, such as highways and aircraft landing strips, without any attendant shimmying, and without undue shock to the load carried on the mobile device. Additionally, such equipment, particularly such items as engine dollies and assembly jigs and fixtures, must be capable of accurate and free movement in any desired direction without the introduction of undesired components of movement such as encountered with conventional casters.

Still further, truck wheel assemblies for aircraft ground handling equipment should be capable of use in connection with and support of a wide variety of different structures without the necessity of substantial modification of the structure of the truck wheel assembly itself.

Bearing in mind the foregoing desirable features, and the disadvantages of conventional truck casters when used for aircraft ground handling equipment, it is a major object of the present invention to provide an improved truck wheel assembly for use in non-automotive industrial vehicles generally, and particularly adapted for use in connection with aircraft ground handling equipment.

More specifically, it is an object of the present invention to provide a truck wheel assembly having the following characteristics:

(1) Absence of shimmy at high and low speeds and even if constrained to a given straight course.

(2) Dynamic directional stability, that is, the tendency to seek and maintain a straight course when towed without special steering linkage.

(3) Ease of wheel removal for the purposes of changing tires or replacing the wheels.

(4) High flotation, that is, absence of road shock.

(5) Simplicity and light weight to permit transport by air where desirable, and also to reduce expense of manufacture and facilitate service.

(6) Complete universality of movement and ability to change course abruptly and while in a static condition.

(7) Relatively small swivel radius, i. e., a relatively small free area required surrounding the wheel structure to permit the same to move in steering and changing course.

(8) Adaptability to controlled steering where desired.

(9) Relatively low mounting height as compared to conventional casters.

(10) Adapatability to either single or dual wheel mounting.

(11) Self-contained shock absorbing or oscillation dampening means.

(12) Individually sprung wheels.

The foregoing additional objects and advantages of the invention will be apparent from the following detailed description of one embodiment thereof, consideration being given also to the attached drawings in which:

Figure 1 is a schematic plan view of an industrial truck incorporating a wheel assembly according to the present invention;

Figure 2 is a schematic plan view similar to Figure 1 illustrating steering action of the truck wheel assembly embodying the present invention;

Figure 3 is an enlarged side elevational view of the truck shown schematically in Figure 1;

Figure 4 is an enlarged elevational view of the truck wheel assembly employed in the front wheels and taken on the line 4—4 of the truck shown in Figure 3;

Figure 5 is an elevational section taken on the line 5—5 in Figure 4;

Figure 6 is a top plan view of the truck wheel assembly illustrated in Figure 4;

Figure 7 is an oblique section taken on the line 7—7 in Figure 4;

Figure 8 is a section similar to Figure 5 illustrating an alternative locking mechanism for the truck wheel assembly illustrated therein;

Figure 15 is a fragmentary view similar to Figure 4 showing a modification of the invention; and Figure 16 is a schematic plan view similar to Figures 1 and 2 showing a modification of the invention.

Figure 9:
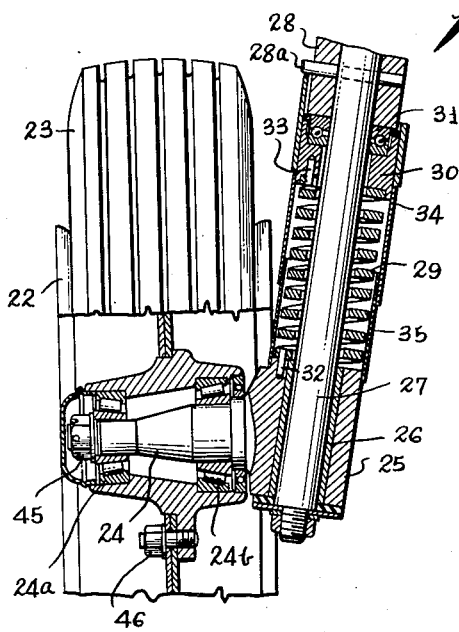
Figure 9 is an enlarged elevational section of a portion of the device illustrated in Figure 4 as shown by the circle 9 therein illustrating the unloaded condition of the wheel assembly.
Figure 10:
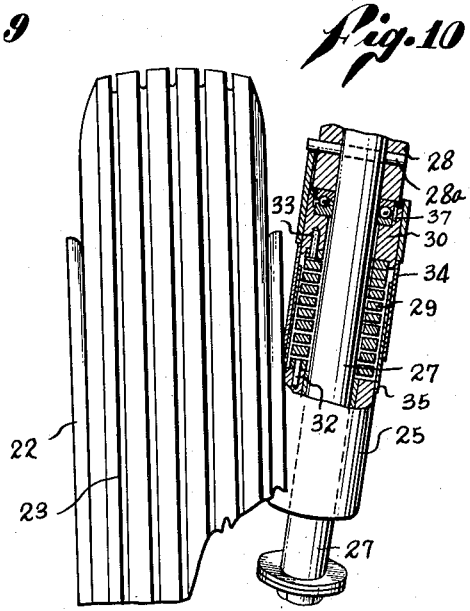
Figure 10 is a view similar to Figure 9, but showing the loaded condition of the assembly.

Throughout the following description, reference will be made to two types of motion of the wheels for accomplishing a change in the rolling direction thereof. One type of direction change will be referred to as "steering," such expression as used herein having reference to relatively small course-changing motion of wheels in following a towing vehicle. The other type of course-changing movement of the wheels will be referred to as "swivelling," the latter being the term applied herein to relatively large rotation of the wheel mounting about a vertical axis at a time when the assembly is in a static condition for the purpose of making a radical change in the course to be followed by the wheels, e. g., a change of 90°. "Swivelling" is necessary, for example, in connection with an engine dolly where it is desired, after bringing an engine into the approximate location for attachment to an aircraft to shift the same laterally by small amounts in order to align bolt holes, or other connecting means. In such cases, use of conventional truck casters is unsatisfactory, since an attempt to move a caster mounted vehicle laterally after the same has been moving longitudinally, results in an undesirable swinging movement of the vehicle, due to the displacement of the caster axis from the point of ground contact. The just-mentioned difficulty, among others, is overcome by the present invention as will be described.

The wheel movements designated respectively as "swivelling" and "steering" are illustrated in Figures 1 and 2. In Figure 1, a vehicle 19 is shown having dual wheel assemblies which are indicated in full line at 20 and in a "swivelled" position in phantom line at 21. In Figure 2, the effect of "steering" is indicated by the angular position of the wheel assemblies 20 at the right-hand end of the figure.

The dual wheel version of my invention is designated generally by the reference character 20 and is illustrated in Figure 4. The dual wheel assembly is bilaterally symmetrical and comprises a pair of wheels 22 carrying pneumatic tires 23. The mounting and support means for the wheels are the same for each wheel and are arranged in "mirror image" relationship. Accordingly, a description of the mounting assembly for one wheel suffices for both.

As can be seen in Figure 9, each wheel is carried on conventional roller bearings 24a and 24b on a stub axle 24.

The axle 24 is formed as a single casting or forging integral with a steering journal 25 having a sleeve bearing 26 inserted therein. The steering axis is defined by a fixed inclined kingpin 27, the upper end of which is pinned, or otherwise permanently secured in a sleeve or socket portion 28 of a swivel body 49. The steering journal 25 and its sleeve bearing 26 is both slidable and rotatable on the kingpin 27. Rotation of the journal 25 about the kingpin 27 results in steering motion of the wheel 22.

The load carried by each wheel 22 is supported through a relatively stiff compression and torsion spring 29, the lower end of the spring 29 being anchored against the steering journal 25 and the upper end abutting a steering knuckle bearing 30, which, in turn, thrusts upwardly against the sleeve 28, a thrust bearing 31 being interposed between the steering knuckle bearing 30 and the sleeve 28. The steering journal 25 is also rotationally coupled to the steering knuckle bearing 30 by the compression spring 29, the ends of the same being pinned to the respective members as indicated at 32 and 33.

A two-part telescopic housing 34—35 surrounds the compression spring 29 and serves the dual purpose of protecting the spring against dust, dirt, and the like, and as a pneumatic shock-absorbing means. The upper section 34 of the housing is fixed to the steering knuckle bearing 30, and the lower section 35 is fixed to the steering journal 25 so that as the spring 29 is compressed, the housing sections 34—35 are telescoped together compressing the air contained therein and providing a snubbing, or shock-absorbing action in conjunction with the operation of the spring 29.

The two kingpins 27, making up the dual wheel assembly are mounted in the two downwardly projecting sockets 28 of the swivel body 49. Each of the wheel mounting assemblies includes also, a steering knuckle arm 40 which is split and provided with a clamping bolt 41, whereby the same is secured and clamped around the steering knuckle bearing 30. As shown in Figure 4, the rearward ends of the two steering knuckle arms 40 are provided with universal connector members 42, which, in turn, are interconnected by a tie rod 43 of adjustable length. Thus, the steering movement of the two wheels 22 of the dual wheel assembly are tied together so that both wheels turn in unison.

The kingpin inclination, the camber angle, the caster angle, are all selected to provide a minimum of scuffing and road friction, and an optimum tracking force on each of the wheels 22 as the vehicle supported thereby is towed, or pushed along a given course. The inter-relationship of such angles is important to the operation of the present invention as will be explained later herein. The tracking forces exerted on each of the wheels due to the forward motion of the vehicle 19, are balanced through the interconnection of the tie rod 43, the steering knuckle arms 40, the knuckle bearings 30, and the compression springs 29 of the respective wheel mounting assemblies.

In this interconnecting linkage, it will be noted, there is a slight amount of yield due to the inclusion of the springs 29. Such yield in the linkage provides for a smoother and more shock-free operation since sudden shocks to one or the other of the two wheels, such as the passage over a bump, or obstacle, by one wheel, but not the other, is taken up in a slight winding, or unwinding, of the springs 29. It will also be noted that the wheels are individually sprung, and that compression of the springs does not interfere with the steering linkage or cause the vehicle 19 to veer one way or the other if one or another of the wheels encounters an obstruction or the load is suddenly changed.

The wheel mounting just described provides the additional advantage of easy removal and replacement of the wheels 22. The same may be removed in their entirety by the removal of a single nut 45 from the end of the axle 24, or alternatively, the tire 23 may be replaced by removing lug nuts 46 which secure the two halves of the wheel 22 together as can be seen in Figure 9.

Each of the wheels in the assembly illustrated in Figure 4 acts somewhat in the manner of the front wheel of a bicycle, that is, the wheels turn to follow the motion of the vehicle as it is moved either by towing or pushing in one direction or another. This self-steering of the wheels is due to the caster or tracking effect, i. e., the effect of having the point of contact of the wheel with the ground offset rearwardly from the axis of the kingpin.

Conventional casters have a tendency to shimmy, that is, to oscillate back and forth as the vehicle is moved in a straight line, particularly if such motion is at relatively high speeds. This oscillation is thought to be due to the fact that when a conventional caster is in the position of optimum tracking, that is, when the point of contact with the ground is directly behind the caster axis, the aligning forces tending to hold the wheel in the correct tracking position are substantially zero. In other words, the drag forces tending to pull the wheel into tracking position become effective only when the wheel is turned a substantial distance out of its correct tracking position. Thus, the conventional caster swings from side to side, each sideward swing being limited when the wheel reaches a sufficient displacement to render the tracking forces sufficient to swing it back. The inertia of the swinging wheel, however, causes it to swing beyond its proper tracking position to the opposite side, and so an oscillation is built up.

In order to reduce and substantially eliminate the tendency to oscillation in caster mounted wheels, I have provided an arrangement in which a substantial tracking force is constantly applied to each wheel to maintain it in the desired alignment and such force is balanced not only as between the two wheels of a dual assembly, but is also balanced to a certain extent by a resultant of the downward force of the load on the vehicle. This balancing of forces is accomplished by a combination of the laterally extending axle arrangement with both fore-and-aft and lateral inclination of the kingpin 27.

In considering the effect of kingpin inclination it should first be observed that as the steering journal 25 rotates about the kingpin 27, any given point in the axle 24 generates a circle about the axis of the kingpin 27. If the kingpin axis is inclined, then the plane of such generated circle is also inclined, and if a load is placed on the vehicle, the axle will, in the absence of other balancing forces tend to rotate to the highest point on such inclined generated circle.

Bearing in mind the factors just stated, it will further be noted that if there were only fore-and-aft inclination of the kingpin 27, the highest point on the generated circle would be directly forward of the kingpin axis. For similar reasons, if the kingpin were inclined only laterally, the highest point on the generated circle would be directly to one side of the kingpin axis.

In the present design, the respective fore-and-aft, and lateral inclinations of the kingpin 27 are so selected that the highest point on the circle generated by a point in the axle is slightly forward of the directly lateral projection illustrated in Figure 4 for example. Thus, with any load placed on the vehicle bed, and with the same in a static position, there is a slight tendency for the axle 24 to rotate forwardly whereby to bring it to the highest point in the generated circle. Such forward movement of the axle is, of course, resisted by the fact that it is linked through the compression springs 29 and the tie rod 43 to the other axle which is urged to swing in the opposite direction.

When the wheel assembly shown in Figure 4 is in motion, it will be realized that the friction forces occasioned by the contact of the tire 23 with the ground, produce a drag force which tends to rotate the axle 24 rearwardly. As previously described, however, the forces occasioned by the kingpin inclination tend to rotate the axle forwardly, and as a result, a condition of substantial dynamic balance is achieved during motion of the vehicle thus substantially eliminating any tendency of the wheel to oscillate from side to side as in conventional casters. In this connection, it should be noted that the drag force above referred to is a substantially direct function of the load on the vehicle. The tendency of the axle to swing forwardly due to kingpin inclination also varies directly with the load. Thus, the dynamic balance of forces tending to hold the wheel in rolling alignment remains effective irrespective of the load on the vehicle.

While casters steering action is quite sufficient to allow the vehicle to follow a towing tractor, or to be pushed along various courses and around relatively large radius curves, it is not sufficient to permit the vehicle 19 to have its course changed abruptly by a relatively large angle. Referring, for example, to Figure 1, it will be seen that with the wheel assemblies in the positions shown in full line, the truck shown is in condition to be towed longitudinally, that is, from left to right in Figure 1. Also, as shown in Figure 2, the vehicle 19 can be caused to follow a curved path by forcing the same sideways, the same being caused to move about the center C indicated in Figure 2. In many applications of mobile ground handling equipment, however, it is desired to stop the vehicle and then move it at right angles to its former course. If such an abrupt change of direction is attempted with the conventional caster, instead of moving directly into the perpendicular path desired, the vehicle first tends to swing rearwardly of its previous movement before the casters are swung around to a tracking position. Such movement interferes with the accurate placement of dollies for loading and unloading purposes, and is particularly annoying in connection with servicing stands and other fixtures which must be accurately placed adjacent an aircraft during construction or servicing.

To obviate this difficulty, I have provided a mounting which permits the wheels to be changed in their direction without any corresponding or resultant movement of the vehicle bed. This change of direction of the wheels as above-mentioned, is termed "swivelling" herein.

The swivelling means I employ includes the swivel base 49 which carries the previously described wheel mounting assemblies. The swivel base 49 is rotatably carried on a generally conical fixed base 50 adapted to be secured to the underside of the vehicle 19, and having a thrust bearing 51 and a radial bearing 52 to facilitate rotation of the swivel base 49. The fixed base 50 is preferably constructed with a square flange, the projecting corners of which are apertured at 53 (Figure 6) to receive bolts for attachment to the vehicle 19.

An integrally cast stub shaft 54 at the center of the fixed base 50 receives the radial bearing 52, which, in turn is held in place by a nut 55 threaded onto the stub shaft 54. By appropriate adjustment of the nut 55, a slight preload may be placed on the bearings 51 and 52 so as to eliminate any play between the fixed base 50 and the swivel base 49.

During the ordinary travel of the vehicle 19, no rotation of the swivel base 49 on the fixed base 50 is required. For this reason, locking means are provided to prevent such rotation under ordinary circumstances. The preferred form of such locking means is illustrated in Figure 5 wherein it will be seen that a barrel 56 is threaded into the swivel base 49 and carries therein a slidable plunger 57 having a hemispherical nose at the upper end adapted to enter any one of a series of conical indentations 58, formed in the fixed base 50. The plunger 57 is urged toward the fixed base 50 by a compression spring 59, which abuts against a flange 60 on the plunger 57 and is anchored in the barrel 56 by an internal snap ring 61.

The plunger 57 is provided at its rearward end with a cross handle 62 which projects through diametrically opposed slots 63 formed in the barrel 56. By pulling downwardly on the handle 62, and rotating the same so as to rest in detent notches 64 in the lower end of the barrel 56, the nose of the plunger 57 is disengaged from the detents 58, and the swivel base is free to rotate about the vertical axis of the step shaft 54.

As can be seen best in Figure 3 wherein the vertical axis of the stub shaft 54 is indicated at Av, the points of contact of the tires 23 lie on diametrically opposite sides of the vertical swivel axis Av, and thus the wheels may be manually rotated to move in orbits about the axis Av without any resultant movement of the vehicle 19.

In the form of the locking device illustrated in Figure 5, the force of the spring 59 is so selected as to permit the plunger 57 to jump out of an engaged indentation 58, if more than a predetermined rotational force is applied to the swivel base 49. Thus, when a course deviation greater than can be accommodated by the steering action about the kingpins 27 is urged by the towing vehicle, or otherwise, the swivel base 49 moves incrementally from one indentation 58 to the next. To this end, the steering knuckle arms 40 are formed with upwardly extending lugs 65 adapted to serve as stops against the projecting end of the pin 28a, whereby to limit the rotation of the steering knuckles with respect to the sockets 28, and to impart torque to the swivel base 49 when the limit of steering rotation is reached.

In the alternative form of lock illustrated in Figure 8, all of the parts illustrated in Figures 4 and 5 are duplicated except that the forward end of the plunger 57a is formed with a relatively long taper as indicated at 66, whereby to fix the swivel base 49 against rotation on the fixed base 50 until the locking plunger 57 is manually withdrawn as previously described.

In some instances, no swivelling action is required, and also in some instances only a single wheel at each corner of the vehicle rather than a dual wheel assembly is required. Each of these modification is embodied in the form of mounting illustrated in Figures 11 and 12, although it will be realized that either modification may be employed independently of the other.

Figure 11:
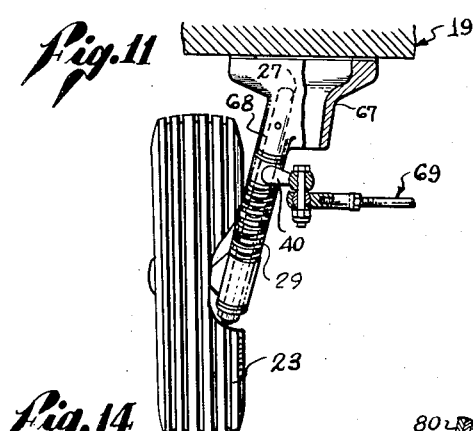
Figure 11 is a partially sectioned front elevational view of a modified form of the assembly employing a single wheel in place of the dual wheels shown in Figure 4.
Figure 12:
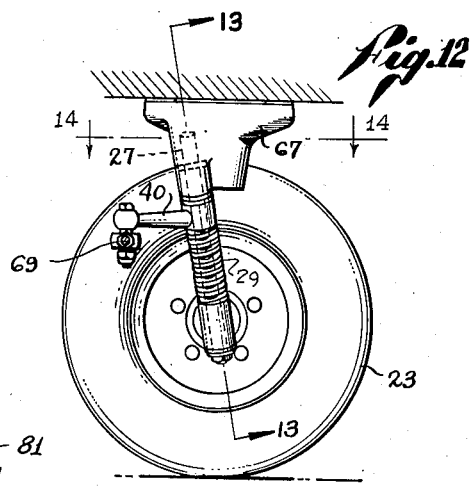
Figure 12 is a side elevational view of the device shown in Figure 11.

As shown in Figures 11 and 12, the single wheel mounting consists of a base 67 having only a single socket member 68 therein to receive the kingpin 27. The remaining elements of the wheel mounting assembly are the same as in the previously described dual wheel assembly with the exception of the fact that the tie rod interconnecting two wheels must of course extend entirely across the vehicle in order to counterbalance the tracking forces of the respective single wheels. Such a tie rod is indicated at 69 in Figure 11.

The non-swivelling version of the device is illustrated in Figures 11 and 12 in that the base member 67 is secured directly to the underside of the vehicle 19. It will be realized of course that various combinations of the modifications thus far described may be used. For example, a four-wheeled vehicle 90 (see Figure 16) may be assembled in which a dual wheel assembly 20 of the type shown in Figure 4 may be employed to mount the front wheels of the vehicle, and a pair of single wheel assemblies having fixed bases 67 such as shown in Figure 11, may be employed as the rear wheels.

In the mounting arrangement illustrated in Figures 1 and 2 and above described, the steering action of the wheels 22 is entirely due to the tracking forces as the course of the vehicle is changed. In such cases, the tow bar 70 is attached directly to the body of the vehicle 19 and is independent of the wheel mounting assemblies. It is customary to provide hinge attachment members as indicated at 71 in Figure 3, whereby the tow bar 70 may be folded to a vertical position, or even back onto the body of the vehicle 19 if desired.

Figure 14:
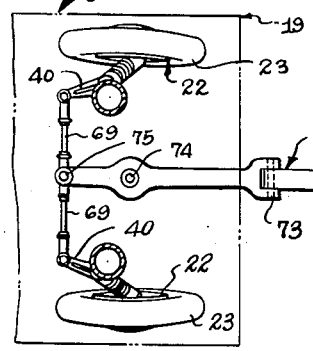
Figure 14 is a plan view taken on the line 14—14 in Figure 12, and illustrating the interconnection of a pair of single wheel assemblies for controlled steering.

In some instances it is desired to control the steering of the vehicle 19 by the application of external steering forces to the steering journal 30, as for example, through a linkage with the tow bar. Such an arrangement is illustrated in Figure 14 wherein it will be seen that a tow bar 72, having a horizontal hinge joint 73 therein is pivotally secured to the underside of the vehicle body as shown at 74, and has the rearward end 75 thereof pivotally connected to the tie rod 69. Thus, it will be seen that as the tow bar 72 is swung in a given direction due to the change of course of the towing tractor, the linkage with the tie rod 69, causes steering motion of the wheels 22 to follow the motion of the towing tractor. While Figure 14 illustrates the single wheel mounting assembly, it will be realized that a similar interconnecting tie rod 76 may be used in connection with the dual wheel assemblies. The attachment of such a tie rod 76 is shown in Figure 15 where it will be seen that one of the connectors 42 is extended upwardly as indicated at 42a to receive the assembly interconnecting tie rod 76, which has a vertical offset therein so as to clear the inner tire 23 of each of the respective assemblies.

As can be seen from an examination of Figure 2, the angular displacement of each front wheel assembly in negotiating an arcuate course is different. This is due to the fact that in order to reduce the scuffing action to a minimum, the extension of the rotary axis of every wheel on the vehicle should, if possible, project through the same point, which, if the rear wheels are non-steerable, lies on an extension of the rear wheel axis. The just-described difference in angular movement is achieved by arranging the steering knuckle arms 40 to converge rearwardly as illustrated in Figure 14. The amount of such convergence, will, of course, depend on the spacing between the front wheels, and also the wheel base of the vehicle. The present invention is adaptable to be adjusted for various wheel bases and various lateral wheel-spacing in that the steering knuckle arms 40 are split, as previously described, and may be adjusted to various angular positions with respect to the steering knuckle bearing 30, and clamped in such adjusted position by the clamping bolt 41. Such adjustment, will, of course, necessitate an adjustment in the length of the tie bars 69, or 76, and conventional means for this purpose are accordingly provided in the present device.

Figure 13:
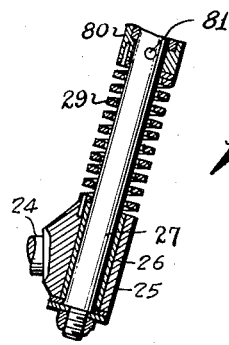
Figure 13 is an elevational section taken on the line 13—13 in Figure 12.

In Figure 13, a still further modification of the wheel mounting is disclosed where it will be seen that in place of the steering knuckle bearing at the upper end of the kingpin 27, a collar 80 is provided to which the upper end of the compression spring 29 is rotationally coupled, the collar in turn being pinned to the kingpin 27 as indicated at 81. This construction is employed for rear wheel mountings and it will be seen that swinging movement of the axle around the axis of the kingpin 27 is resisted by the spring 29 whereby the wheel is substantially non-steering. A slight amount of swinging movement of the axle is permitted, however, due to the winding and unwinding of the spring 29, in addition to which the spring 29 serves in the usual manner to spring float the load.

While the forms of the device shown and illustrated herein are fully capable of achieving the objects and providing the advantages hereinbefore stated, it will be realized that they are capable of some modification without departure from the spirit of the invention. For this reason, I do not mean to be limited to the forms shown and described, but rather to the scope of the appended claims.

I claim:

1. A vehicle wheel mounting assembly comprising: a pair of kingpins; base means mounting said kingpins in laterally-spaced position on the bed of a vehicle in a common rearwardly inclined plane; a pair of aligned wheel axles positioned in said plane and projecting laterally in opposite directions, each of said axles being journally supported on a corresponding one of said kingpins adjacent the lower end thereof; a pair of open coil, helical springs, one carried on each said kingpin above the axle thereon the lower end of each spring abutting and rotationally secured to the respective axle therebelow; a pair of terminal members each connected to the upper end of a corresponding one of said springs, each of said terminal members abutting said base means and being rotatably mounted on the respective kingpins carrying the springs to which it is connected; and a linkage rotatively coupling said terminal members whereby to coordinate the swinging of said axles to steer wheels thereon.

2. A wheel assembly for a wheeled vehicle, comprising: a fixed base adapted to be secured to the underside of a vehicle bed; a swivel base mounted on the underside of said fixed base; bearings interposed between said bases to support said swivel base for rotation on said fixed base about a vertical axis; a lock having complemental parts on said respective bases engageable to lock said swivel base against said rotation thereof; a kingpin fixed in said swivel base and projecting downwardly therefrom on an inclined axis; a substantially horizontal axle having a journal bearing at one end carried on said kingpin to support said axle for swinging movement about said kingpin and for translation therealong toward and away from said bases; an open coil helical spring surrounding said kingpin above said axle bearing, said spring having its lower end abutting and rotationally secured to said axle; and having its upper end adjacent to said swivel base; a second kingpin, axle, and spring each arranged in mirror image relation respectively to said first-mentioned kingpin, axle, and spring, said kingpins being mutually divergent downwardly; and restraining means including a rotational coupling fixed to the upper ends of said springs to control said swinging of said axles and interposed between the respective upper ends of said springs and said swivel base to form upper abutments for said springs.

3. The construction of claim 2 further characterized in that one of said lock parts is spring urged into said engagement and adapted to disengage said complemental part to permit rotation of said swivel base on said fixed base upon a predetermined torque being applied to said swivel base.

4. A vehicle wheel mounting assembly comprising: a pair of kingpins; base means mounting said kingpins in laterally spaced position on the bed of a vehicle in a common rearwardly tilted plane; a pair of aligned wheel axles positioned substantially in said plane and projecting laterally in opposite directions, each of said axles being journally and slidably supported on the axis of a corresponding one of said kingpins for swinging movement thereabout and translation therealong; and rotational coupling means connected between said axles coordinating the swinging of said axles about said respective kingpin axes to swing one of said axles forwardly with respect to said plane when the other is swung rearwardly whereby to steer said vehicle, said coupling means including a member journalled on each kingpin adjacent the upper end thereof and rotatively connected to the axle on the same kingpin therewith and a portion of said coupling means extending along each kingpin between said axle and member thereon to restrain translation of said axles along their respective kingpins.

5. The construction of claim 4 further characterized in that said kingpins are downwardly divergent in said plane.

6. The construction of claim 4 further characterized in that said last mentioned portion of said coupling means is a helical spaced coil compression spring on each of said kingpins abutting said member and axle thereon whereby the translation of each of said axles along its respective kingpin is yieldingly resisted by said spring to spring-mount said wheels with respect to said vehicle.

References Cited in the file of this patent

UNITED STATES PATENTS

| | | |
|---|---|---|
| 283,712 | Hurd | Aug. 21, 1883 |
| 1,064,111 | Tower | June 10, 1913 |
| 1,376,040 | Roberts | Apr. 26, 1921 |
| 1,676,381 | Callison | July 10, 1928 |
| 1,766,506 | Delpini | June 24, 1930 |
| 2,046,206 | Ose | June 30, 1936 |
| 2,064,107 | Gerardi | Dec. 15, 1936 |
| 2,172,387 | Kantrowitz | Sept. 12, 1939 |
| 2,537,521 | Forbes | Jan. 9, 1951 |
| 2,684,237 | Kaylor | July 20, 1954 |